United States Patent [19]
Stebe

[11] 3,829,897
[45] Aug. 13, 1974

[54] CARTRIDGE CLAMP

[75] Inventor: Robert F. Stebe, Thousand Oaks, Calif.

[73] Assignee: VRC California Inc., Los Angeles, Calif.

[22] Filed: May 4, 1973

[21] Appl. No.: 357,197

[52] U.S. Cl. .......... 360/133
[51] Int. Cl. .......... G11b 25/04
[58] Field of Search .......... 274/4.1; 292/256.69; 346/137; 340/174.1 C; 179/100.2 Z

[56] References Cited

UNITED STATES PATENTS

| | | | |
|---|---|---|---|
| 3,593,327 | 7/1971 | Shill | 340/174.1 |
| 3,609,722 | 9/1971 | Zenzetilis | 340/174.1 |
| 3,635,608 | 1/1972 | Grouch | 340/174.1 |

*Primary Examiner*—Vincent P. Canney
*Attorney, Agent, or Firm*—Fraser and Bogucki

[57] ABSTRACT

A magnetic disc cartridge memory unit is disclosed having a pair of interconnecting clamping members releasably holding a disc cartridge in the memory unit when the clamping members are in a first position, and allowing removal or replacement of the cartridge when the clamping members are moved into a second position. The clamping members are interconnected so that movement of one into one of the positions results in movement of the other clamping member into a corresponding position, and vice versa. A rod rigidly couples each of the clamping members to a cranking element. Each cranking element is pivotally coupled at the end opposite the rod to a different elongated connecting element. A circular element rotatably mounted between the cranking elements is pivotally coupled at opposite ends to the elongated connecting elements. A biasing unit coupled between the base and the circular element biases the circular element in one or the other of two opposite positions.

16 Claims, 3 Drawing Figures

CARTRIDGE CLAMP

BACKGROUND OF THE INVENTION

1. Field of the Invention

This invention relates to magnetic disc memory units. More particularly this invention relates to clamping devices for use in magnetic memories utilizing magnetic disc cartridges requiring specific holddown pressures during operation.

2. Description of the Prior Art

Typically, a cartridge for use in a magnetic disc drive memory unit includes a cylindrical housing having one or more magnetic storage discs located within a chamber defined thereby together with a dust cover removably enclosing one side of the cylindrical housing when not in use. The cylindrical housing fits within a well of the base of a magnetic disc storage unit. In operation, the dust cover is disposed on the side of the cylindrical housing remote from a spindle. Radial openings are disposed along the side of the cylindrical housing for allowing access by flying head pads. The spindle is located at the bottom of the well for causing a rotation of magnetic discs within the cartridge. Rotation of the spindle causes an air current pressure between the disc and the cartridge urging the cartridge away from the spindle or causing vibration. If allowed to so move, the cartridge could cause the flying head pads to come in contact with the disc surface. Such contact may result in a phenomenon known as headcrash in which the flying head pad suddenly scrapes away the metal oxide coating of the disc, thereby destroying data and requiring costly down time in maintenance. In order to prevent such headcrash, the cartridge is normally held down within the well of the base by clamps at a specific pressure. The clamps bear on the dust cover which exerts a pressure on the cylindrical housing.

Independently operated clamps have been used in the past. Thus, when it is desired to change disc cartridges, the operator must individually open each clamp, remove the dust cover and the cylindrical housing, pick up the replacement cartridge and then insert the cylindrical housing of the replacement cartridge in the well. After the dust cover is placed on the cylindrical housing, the clamps must then be closed individually. This is inconvenient and cumbersome particularly if the operator has another cartridge in his other hand. Thus it would be desirable to have a cartridge clamp mechanism in a magnetic disc drive storage unit which could be opened and closed with one hand, yet provide a desired downward force for counteracting the air current pressure caused by the rotating disc.

SUMMARY OF THE INVENTION

A magnetic disc drive storage unit in accordance with this invention generally comprises an information storage unit having a pair of generally L-shaped clamping members extending over a well of a base of the storage unit. Each of the clamping members is movable between a first position which clamps a disc cartridge to the storage unit and a second position which permits removal of the disc cartridge from the storage unit. The clamping members are interconnected such that each clamping member is responsive to a movement of the other into the first or the second position for moving the clamping member into the first or second position respectively.

DESCRIPTION OF THE PREFERRED EMBODIMENT

Figure 1:
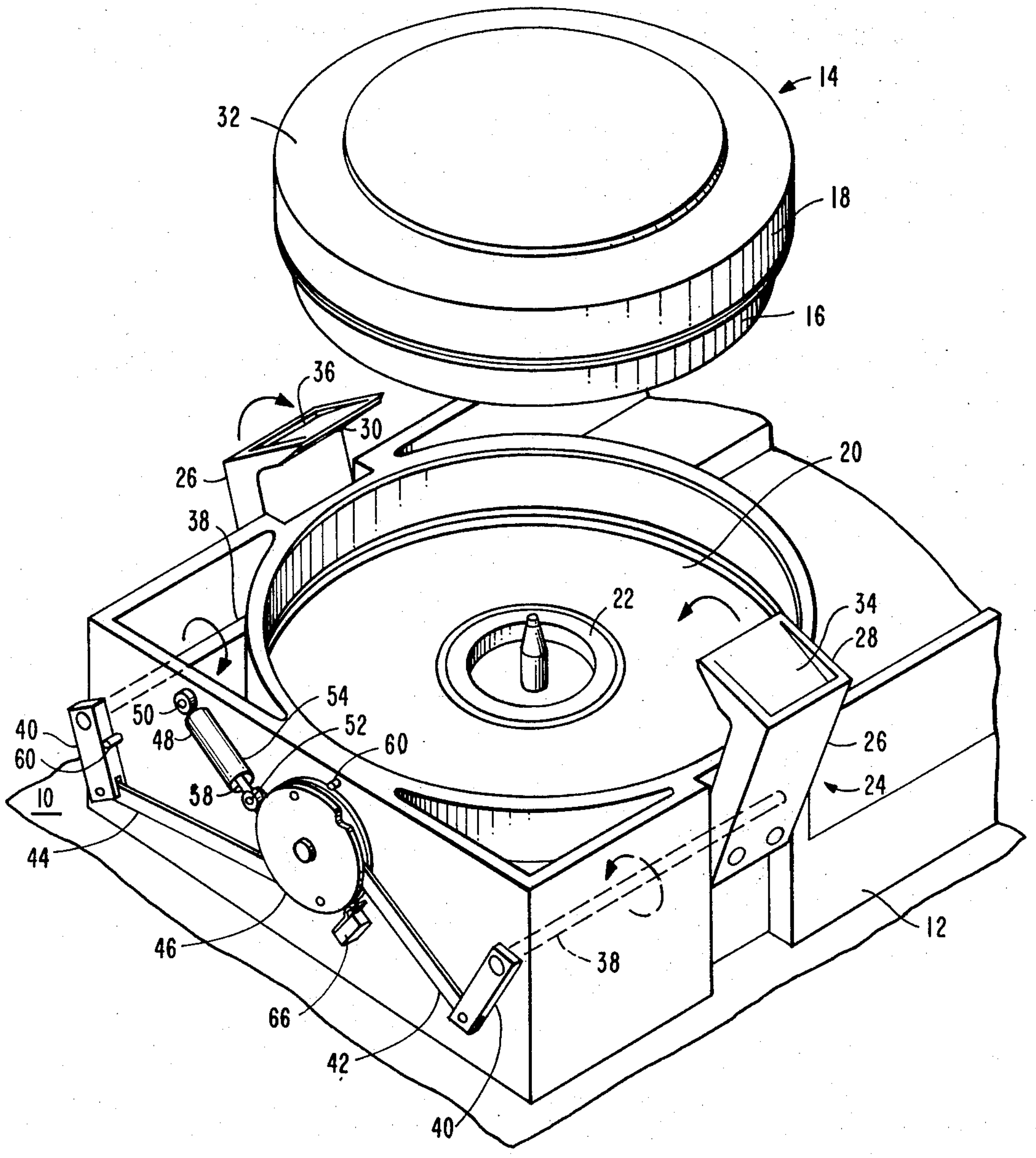
FIG. 1 is a perspective view with portions removed of an embodiment of this invention depicting the clamping members outside the generally circular operative position with a cartridge about to be placed in the well of a magnetic disc drive memory unit.

Referring particularly to FIG. 1, a perspective view of an embodiment of the invention is shown with portions exposed and portions removed. A magnetic disc memory unit 10 is shown comprising a base 12 for maintaining a cartridge in a desired position with respect to a flying head assembly. A cartridge 14 comprising a cylindrical housing 16 and a dust cover 18, is shown suspended above a well 20 of the base 12. A spindle 22 rotatably coupled to the base is disposed within the well 20. The cylindrical housing 16 of the cartridge 14 mates with the well 20 and the spindle 22 when placed in the well as indicated by the dashed lines from the cartridge 14 to the well 20, while the dust cover 18 is disposed on the cylindrical housing 16.

Figure 2:
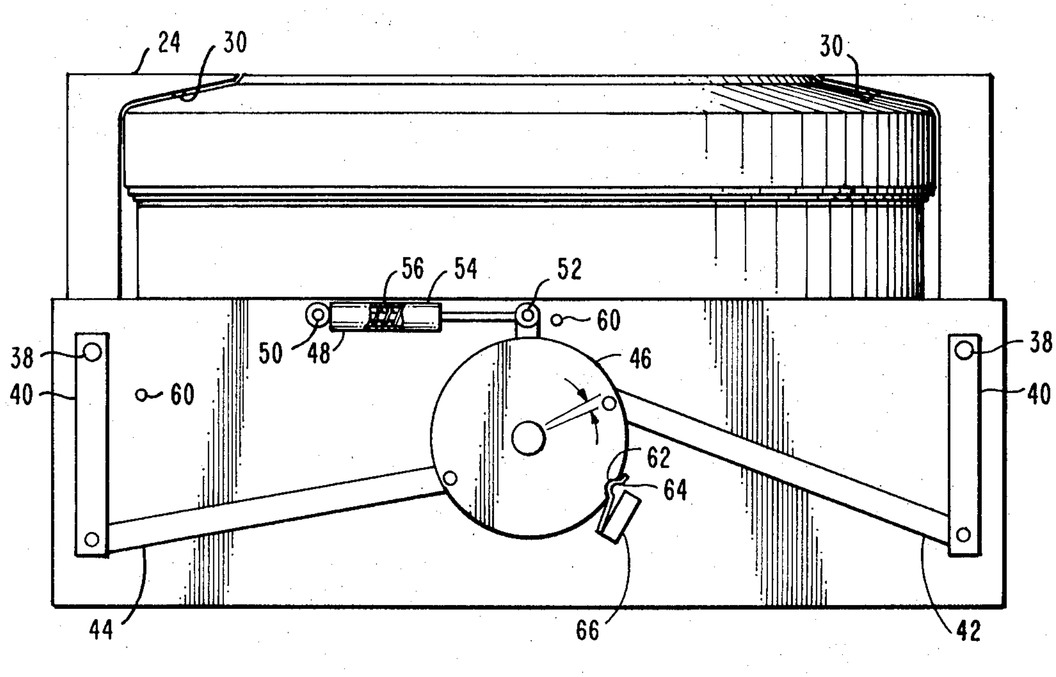
FIG. 2 is a side view with portions removed of the arrangement of FIG. 1 with the clamping members in an operative position and with the cartridge in place; and, FIG. 3 is a side view of the arrangement of FIG. 1 with the clamping members outside the generally circular operative position.
Figure 3:
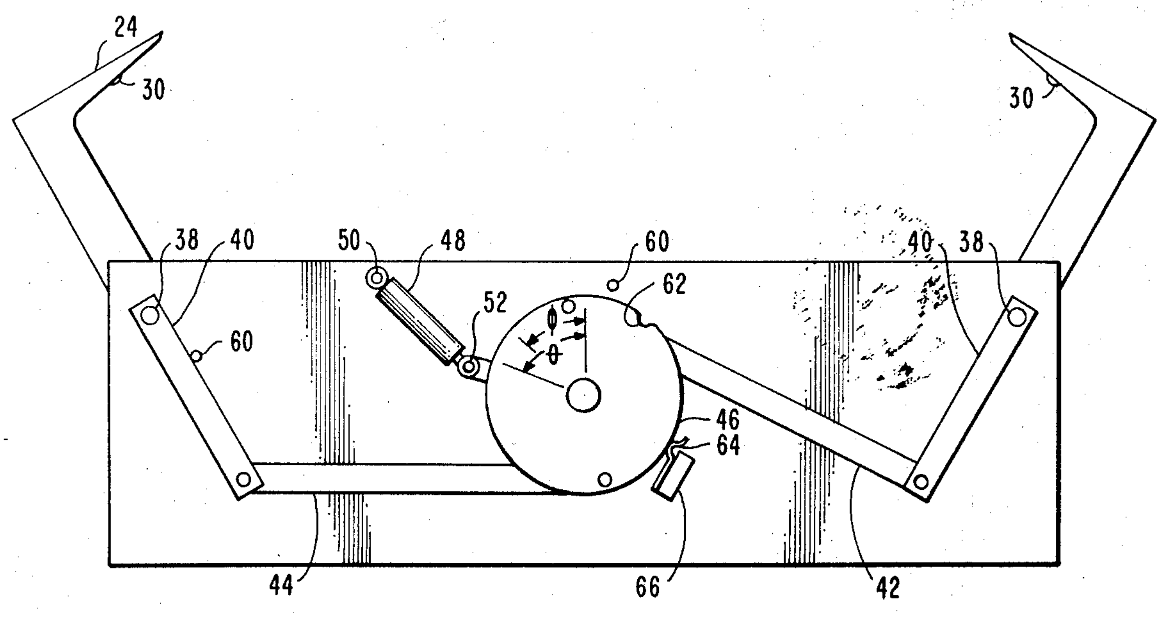

A pair of clamping members 24 coupled at opposite sides of the base 12 are pivotable between a first position shown in FIG. 2 in which each clamping member 24 extends over a generally circular operative position for the cartridge 14 and a second position, as shown in FIG. 1 and FIG. 3, in which each clamping member is outside of the generally circular operative position. Each clamping member 24 comprises a first or upright portion 26 and a second or extending portion 28 extending generally laterally from an end of the first portion to form a generally L-shaped structure. The second or extending portion 28 includes a contact area 30 for exerting a predetermined force having a component parallel to a central axis of the well 20 on a pressure receiving surface 32 of the cartridge 14. The contact area 30 may be defined by a small convex button of nylon or other suitable material protruding from the extending portion 28. The extending portion 28 also includes a recess 34 on the side opposite the pressure receiving surface partly defined by a surface 36 which is generally parallel to the upright portion 26 of the clamping member 24. The recess 34 facilitates manually grasping and outwardly rotating the clamping members 24 to the second position.

In the embodiment of FIGS. 1–3, the biasing means 48 is coupled to the cylindrical element 46 such that when the clamping members are in the first or closed position, the desired force exerted by the spring on the cylindrical element is a maximum and is perpendicular to a radius of the cylindrical element. Each contact area 30 must typically exert a five pound force in a direction parallel to the axis of the well. A torque on the order of 2.4 pounds about the pivot axis of the cylindrical element 46 may provide such a force. Such a torque may be developed with a spring having a constant on the order of 1.1 pounds/inch, a spring compression of 2 inches and a lever arm of 2 inches. A typical spring selected may have an outer diameter on the order of 0.24 inches and a wire diameter on the order of 0.03 inches. It should be recognized that the design of the biasing means may vary and the aforementioned figures are provided merely as an example. It should be further recognized that the use of a tension spring is within the scope of this invention.

Each upright portion 26 of each clamping member 24 is fixedly attached to a different one of a pair of rotatably mounted, generally parallel rods 38 such that each rod 38 rotates in response to a pivoting of the associated clamping member 24 and vice versa. A different elongated cranking element 40 is fixedly joined to each associated rod 38 remote from the fixed attachment of the rod 38 to the upright portion 26. Thus, each cranking element 40 rotates with the associated rod 38.

The end of one of the cranking elements 40 opposite the associated rod 38 is coupled to an elongated connecting element 42, while the end opposite the associated rod 34 of the other cranking element 36 is coupled to an elongated connecting element 44. The cranking elements 40 transmit a displacement to the connecting elements 42, 44 and vice versa.

A generally cylindrical element 46 is rotatably mounted to the base 12 about a pivot having an axis generally parallel to the axes of the rods 38. The elongated connecting elements 42, 44 are pivotally attached to the generally cylindrical element 46 at opposite portions of the axis of the cylindrical element 46.

The angle between the connecting element 42 and its associated cranking element 40 is less than the angle between the connecting element 44 and its associated cranking element 40. This disparity in the two angles would cause a difference in the arc of rotation between the two clamping members 24 if compensation were not provided. In the preferred embodiment, the connecting element 42 is joined to the cylindrical element 46 at a pivot disposed, for example, 6° beneath an imaginary line through the pivotal attachment of the connecting element 44 to the cylindrical element 46 and the axis of rotation of the cylindrical element 46. This compensation assures that a rotation of one of the clamping elements 24 will cause an equal rotation of the other of the clamping elements 24. Other forms of compensation may be provided. For example, the length of the elongated connecting element 44 may be made longer than the length of the elongated connecting element 42.

The biasing means 48 are coupled between a reference 50 on the base 12 and the generally cylindrical element 46 at a pivot 52. The biasing means 48 have a predetermined force characteristic for urging the pair of clamping members 24 into the first position with a predetermined force when the element 46 has an angular position less than a first amount $\phi$ and for urging the pair of clamping members 24 in the second or open position when the cylindrical element 46 has an angular position greater than a second amount $\theta$. The biasing means 48 comprises a housing 54 pivotally coupled to the reference 50 with respect to the base 12, a compression spring 56 situated in the housing and a plunger 58 having one end thereof pivotably coupled to the cylindrical element at the pivot 52 and an opposite end (not shown exposed) disposed within the housing 54 and bearing against the spring 56.

A pair of opposite stop elements 60 extend from the base for limiting the movement of the cylindrical element 46 to within a selected arc of rotation, thereby preventing overtravel. Overtravel is undesirable in that it causes the line of the action of the forces applied by the elongated connecting elements 42 and 44 to define a very short lever arm about the axis of the cylindrical element 46 and thus requires the operator to exert large forces on one of the clamping members 24 to return the clamping members 24 to a desired position.

In the preferred embodiment, the generally cylindrical element 46 has a detent 62 which mates with a pawl 64 extending from a microswitch 66 when the clamping members are in the operative position. The microswitch is coupled to the disc drive system to allow rotation of the spindle 22 only when the pawl 64 of the microswitch 66 is engaged in the detent 62. Where the microswitch 66 is not engaged in the detent 62, the circuit is coupled so that the spindle 22 will not rotate. This prevents damage to the disc, the flying head pad and other equipment when the clamping members 24 are not in the operative position.

FIGS. 2 and 3 are referred to in describing the operation of this invention. In the first or operative position, as depicted in FIG. 2, the opposing clamping members 24 exert a force having a component parallel to an axis of the well directed toward the spindle 22. The vertical force maintains the cartridge 14 in the well 20 and prevents air pressure resulting from the rotating disc and spindle 22 from causing headcrash of the flying head pads onto the disc surface.

In the closed or operative position, the plunger 58 of the biasing means 48 exerts a force on the cylindrical element 46 tending to rotate the cylindrical element 46 in a direction indicated by the arrow as shown in FIG. 2. With no cartridge in the well 20, the rotation is limited by one of the stop elements 60. However, when the cartridge 14 is in the well 20, the rotation of the element 46 is limited by the pressure receiving surface 32 of the cartridge 14. The biasing means 48 transmits a predetermined force to the clamping members 24 maintaining the cartridge 14 in the well 20 at a desired pressure.

When it is desired to release the cartridge 14 from the well 20, a single hand is used to grasp the recess 34 and the upright portion 26 of one of the clamping members 24. The grasped clamping member 24 is pivoted outward from the axis of the well 20 about an axis defined by the associated rod 38. The rod 38 which is responsive to the rotation of the clamping member 24 transmits the rotation to the associated cranking element 40. At the other end of the cranking element 40 a pivotal connection of one of the elongated connecting elements 42 or 44 causes a displacement of the elongated connecting element 42 or 44 in response to the rotation. The elongated connecting element 42 or 44 causes rotation of the cylindrical element 46 as indicated by the arrow thereon. The elongated connecting element 44 or 42 on the opposite side of the cylindrical element 46 responds to the rotation of the cylindrical element 46 and causes displacement of the connecting element 44 or 42, rotating the associated cranking element 40. Since the cranking element 40 is rigidly fixed to the associated rod 38 and the rod 38 is rigidly fixed to the corresponding clamping member 24, the rotation of the cranking element 40 causes a corresponding rotation of the rod 38 and the clamping member 24. Thus an outward movement of either of the clamping members 24 causes a corresponding rotation of the other clamping member 24.

With the clamping members 24 in the second or extended position, the disc cartridge 14 is released and is now removable. The dust cover 18 and thus the cylindrical housing 16 of the cartridge 14 are lifted upward and another cartridge may be substituted.

When it is desired to close the clamping members 24, one of the clamping members is grasped with the hand and rotated toward the central area of the well 20. The rotation of the clamping member 24 causes a rotation of the associated rod 38 and cranking element 40. Rotation of the cranking element 40 in turn causes a displacement of the associated one of the elongated connecting elements 42, 44 which imparts a rotation to the cylindrical element 46. This rotation imparts a displacement to the other of the connecting elements 42, 44 causing rotation of the associated cranking element 40, rod 38 and clamping member 24. The contact area 30 on extending portion 28 portion 28 exerts a force on the dust cover 18 of the cartridge 14 having a vertical component downward and a lateral component toward the axis of the well. The vertical force component exerted by the clamping members 24 bears on the pressure receiving surface 32 of the cartridge 14 preventing upward travel or vibration of the cartridge 14 during rotation of the spindle 22.

Thus, a magnetic disc drive storage unit having interconnected clamping members has been disclosed which provides convenience in the changing of disc cartridges and provides a desired holding force on a disc cartridge for preventing headcrash.

While the invention has been particularly shown and described with reference to a preferred embodiment thereof, it will be understood by those skilled in the art that various changes in form and details may be made therein without departing from the spirit and scope of the invention.

What is claimed is:

1. In an information storage unit in which a magnetic disc cartridge is releasably held in an operative position within the storage unit by a plurality of movable clamping members, each of the clamping members being movable between a first position which clamps the disc cartridge to the information storage unit and a second position which permits removal of the disc cartridge from the information storage unit, the improvement comprising means interconnected between the plurality of clamping members and responsive to movement of one of the clamping members into the first or second position for moving the other clamping members into the first or second position respectively.

2. The invention as set forth in claim 1, wherein the plurality of movable clamping members comprises a pair of clamping members mounted on opposite sides of a generally circular operative position for the disc cartridge and each being pivotable between the first position in which the clamping member extends over the generally circular operative position and the second position in which the clamping member is outside of the generally circular operative position.

3. The invention as set forth in claim 1, wherein the means for moving the other clamping members includes means for normally urging the clamping members into the first or the second positions.

4. In an information storage unit utilizing a magnetic disc cartridge which is located within a well in the storage unit when in use, a clamp mechanism for releasably clamping the cartridge in the well comprising:

first and second movable clamp means coupled to the storage unit in locations remote from each other, the first and second movable clamp means engaging a cartridge disposed within the well to maintain the cartridge thereon when each is moved into a first position and disengaging the cartridge to permit removal of the cartridge from the well when each is moved into a second position:

a first member coupled to the fifst clamp means and operative to undergo a displacement in a given direction in response to movement of the first clamp means between the first and second positions;

a movable element coupled to the first member remote from the first clamp means and responsive to the displacement of the first member in a given direction for undergoing a displacement generally opposite the given direction; and a second member coupled between the second clamp means and the movable element and operative to undergo a displacement opposite the given direction in response to displacement of the movable element, the displacement of the second member moving the second clamp means between the first and second positions.

5. The invention as set forth in claim 4, wherein the movable element comprises a rotatably mounted circular element having the first and second members pivotally coupled to opposite portions thereof.

6. The invention as set forth in claim 4 and comprising compensation means for causing a rotation of one of the clamping members to be equal in arc to a rotation of the other of the clamping members.

7. The invention as set forth in claim 4, wherein the first and second clamp means each comprise an upright portion terminating in an extending portion which extends toward the well and includes a contact area for exerting a predetermined force having a component parallel to a central axis of the well on a pressure receiving surface of the cartridge.

8. The invention as set forth in claim 4, further including biasing means having a predetermined force characteristic coupled to the movable element for urging the first and second clamp means into the first position with a predetermined force when the movable element has an angular position less than a first amount and for urging the first and second clamp means into the second position when the movable element has an angular position greater than a second amount.

9. The invention as set forth in claim 8, further including opposite stop means limiting movement of the movable element to within a selected arc of movement.

10. The invention as set forth in claim 9 and further including sensing means for providing an indication when the first and second movable clamp means are out of the first position and comprising:

a detent on the movable element; and a pawl extending from a switching element, mating with the detent on the first position.

11. An arrangement for releasably clamping a cylindrical magnetic disc cartridge in a mating, generally cylindrical well within an information storage unit comprising:

first and second rods rotatably mounted in generally parallel relation to one another on opposite sides of the well;

first and second clamps respectively mounted on the first and second rods on opposite sides of the well, each of the clamps being movable into and out of the well in response to rotation of the associated one of the first and second rods;

first and second elongated cranking elements having one end fixedly mounted on the first and second rods respectively;

a generally cylindrical element mounted between the first and second cranking elements for rotation about an axis generally parallel to the first and second rods; and first and second elongated connecting elements having first ends respectively pivotally coupled to the first and second cranking elements at ends thereof opposite said one end and second ends pivotally coupled to opposite portions of the cylindrical element.

12. The invention as set forth in claim 11, wherein each of the first and second clamps comprises a first portion fixedly mounted at one end to the associated one of the first and second rods and having a second portion extending generally laterally from an opposite end of the first portion to form a generally L-shaped structure.

13. The invention as set forth in claim 12, wherein the second portion of each clamp has a contact area on one side thereof for pressing against the disc cartridge to clamp the cartridge, and a recess on the opposite side thereof, said recess being partly defined by a surface which is generally parallel to the first portion of the clamp.

14. The invention as set forth in claim 11, wherein the cylindrical element undergoes rotation between a pair of opposite positions as the clamps move into and out of the well, and further including means for normally biasing the cylindrical element into one or the other of the opposite positions.

15. The invention as set forth in claim 14, further including means for preventing rotation of the cylindrical element past the opposite positions.

16. The invention as set forth in claim 14, wherein the biasing means comprises a housing pivotally coupled to a fixed reference point, a spring situated in the housing, and a plunger having one end thereof pivotably coupled to the cylindrical element and an opposite end disposed within the housing and against the spring.

* * * * *